(No Model.)

K. SCHNEIDER.
VEGETABLE STEAMER.

No. 391,085. Patented Oct. 16, 1888.

Witnesses.
A. Ruppert.
H. A. Daniels.

Inventor.
Kate Schneider.
Per
Thomas P. Simpson.
Atty.

United States Patent Office.

KATE SCHNEIDER, OF NEW RICHLAND, MINNESOTA.

VEGETABLE-STEAMER.

SPECIFICATION forming part of Letters Patent No. 391,085, dated October 16, 1888.

Application filed April 16, 1888. Serial No. 270,873. (No model.)

*To all whom it may concern:*

Be it known that I, KATE SCHNEIDER, a citizen of the United States, residing at New Richland, in the county of Waseca and State of Minnesota, have invented certain new and useful Improvements in Vegetable-Steamers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of my invention is to construct a vegetable steamer so that it may be reversed during the cooking process, thus enabling the article to be equally cooked on both sides.

Figure 1:
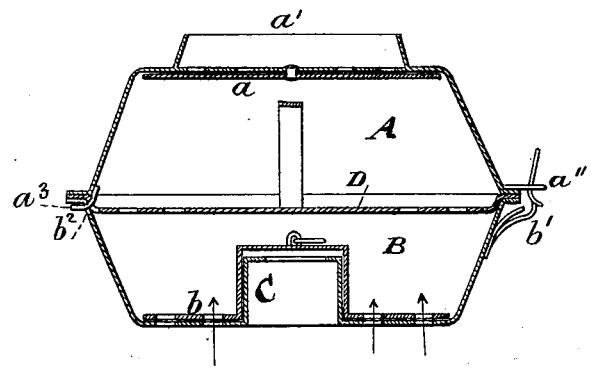
Figure 2:
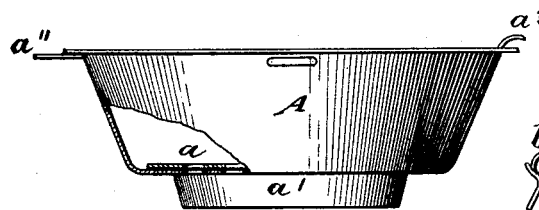
Figure 3:
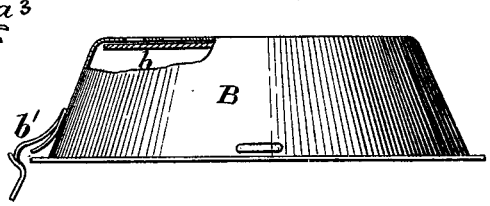
Figure 4:
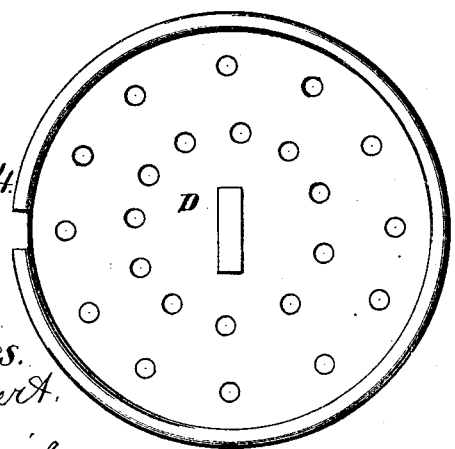

Figure 1 of the drawings is a vertical section of my reversible steamer; and Figs. 2 and 3 are detail views, in side elevation, of the two sections of the vegetable-steamer, each being broken away to show the valve. Fig. 4 is a top plan view of the perforated partition which separates the upper and lower chambers of the steamer.

In the drawings, A B represent the two sections of my steamer in which the vegetables are cooked, each section being open at top, perforated at bottom, and provided with a correspondingly-perforated valve. These valves $a\ b$ may be centrally secured to the bottoms of the sections A B, so that they may be fastened to open or close, the lower valve being always open for the reception of steam, and the one which is uppermost being always closed steam-tight, or approximately so. The two sections A B may be connected by the spring-latch $b'$ on section B and the loop-catch $a''$ on section A, or by the lip $a^3$ on section A and the slot $b^2$ on section B. On section A is shown the outwardly-projecting flange $a'$ to fit a funnel in the mouth of kettle, while on section B is shown the modification consisting of an inward tubular projection, C, to fit over the mouth of kettle, as well as to receive a correspondingly-constructed valve, $b$.

The mode of operation is as follows: The vegetables are placed in the steamer, and during the process of cooking the sections A B are reversed in position at such times as will allow the steam to ascend for about the same length of time through each of the sections, so that the vegetables will be uniformly steamed on both sides and thus cooked through. By this means I overcome the oft-made objection that they are overdone or underdone.

Having thus described all that is necessary to a full understanding of my invention, what I claim as new, and desire to protect by Letters Patent, is—

A vegetable-steamer consisting of two detachably-connected sections, A B, each having a perforated bottom, dampers to close the perforations, and a perforated partition between the sections, all substantially as shown and described.

In testimony whereof I affix my signature in presence of two witnesses.

KATE SCHNEIDER.

Witnesses:
LEWIS M. PASCHALL,
JOHN KREUZER.